May 15, 1962  C. W. STRZALKOWSKI  3,035,127
HEARING AIDS
Filed April 15, 1955  4 Sheets-Sheet 2
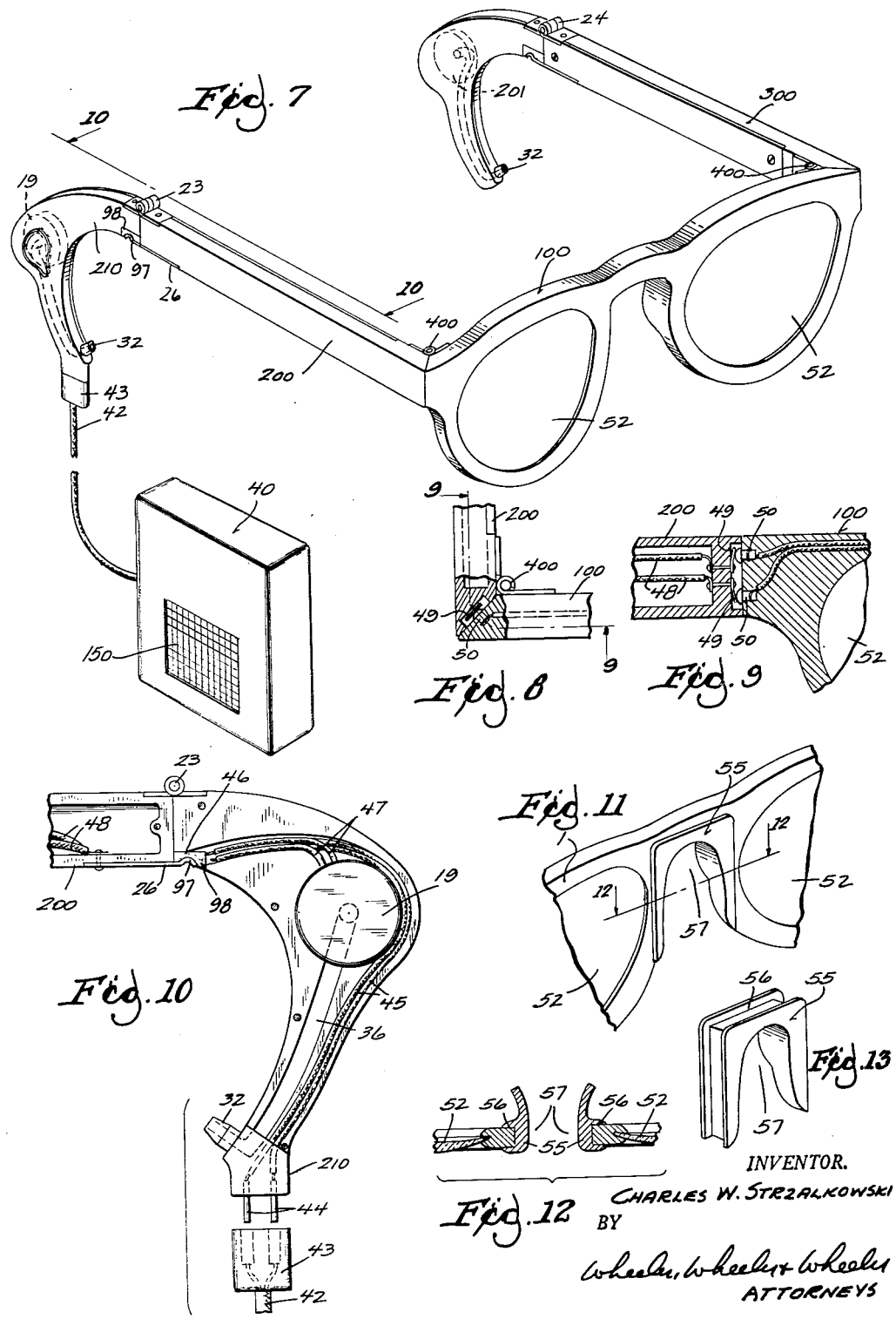
INVENTOR.
CHARLES W. STRZALKOWSKI
BY
Wheeler, Wheeler + Wheeler
ATTORNEYS

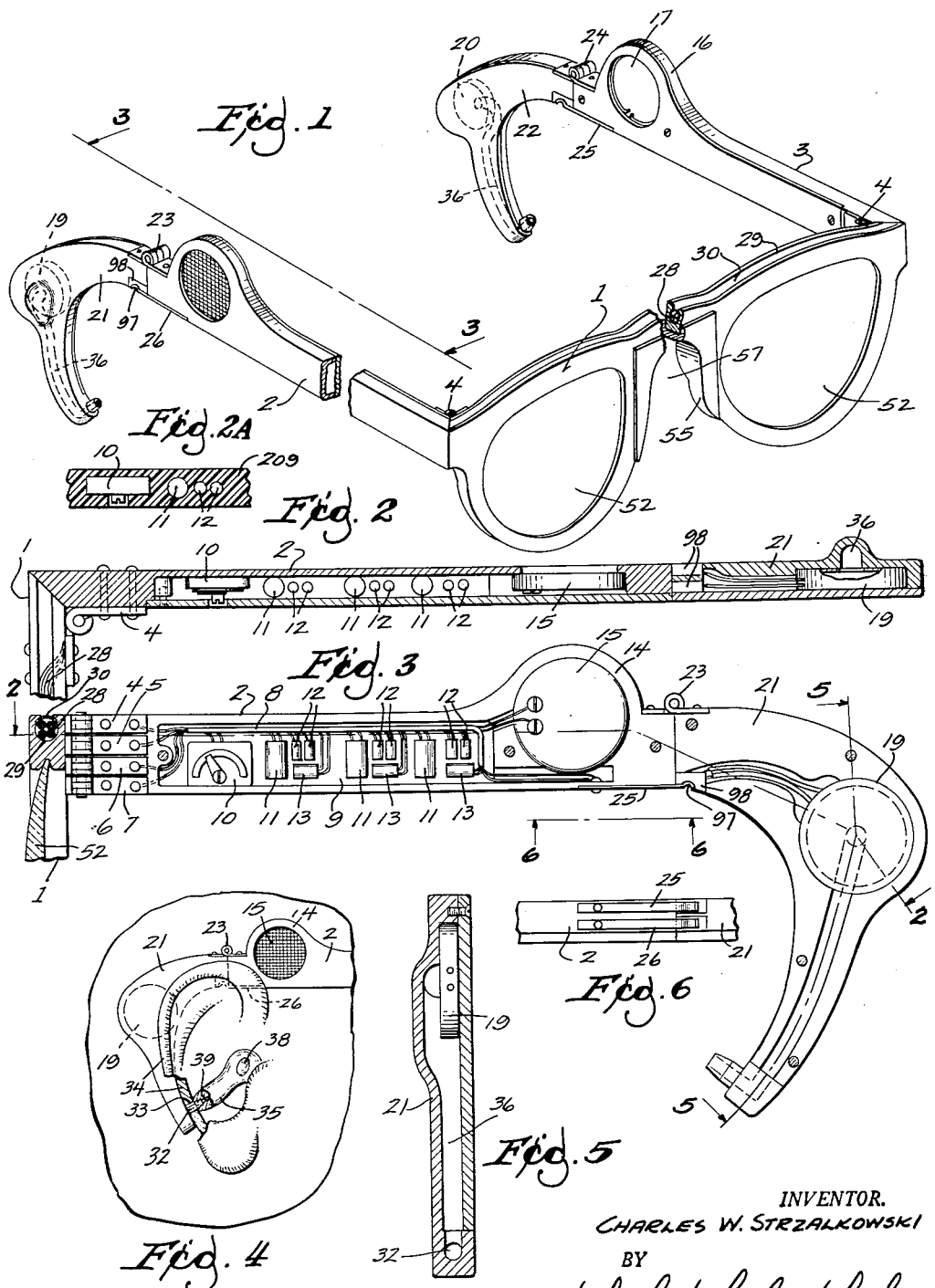

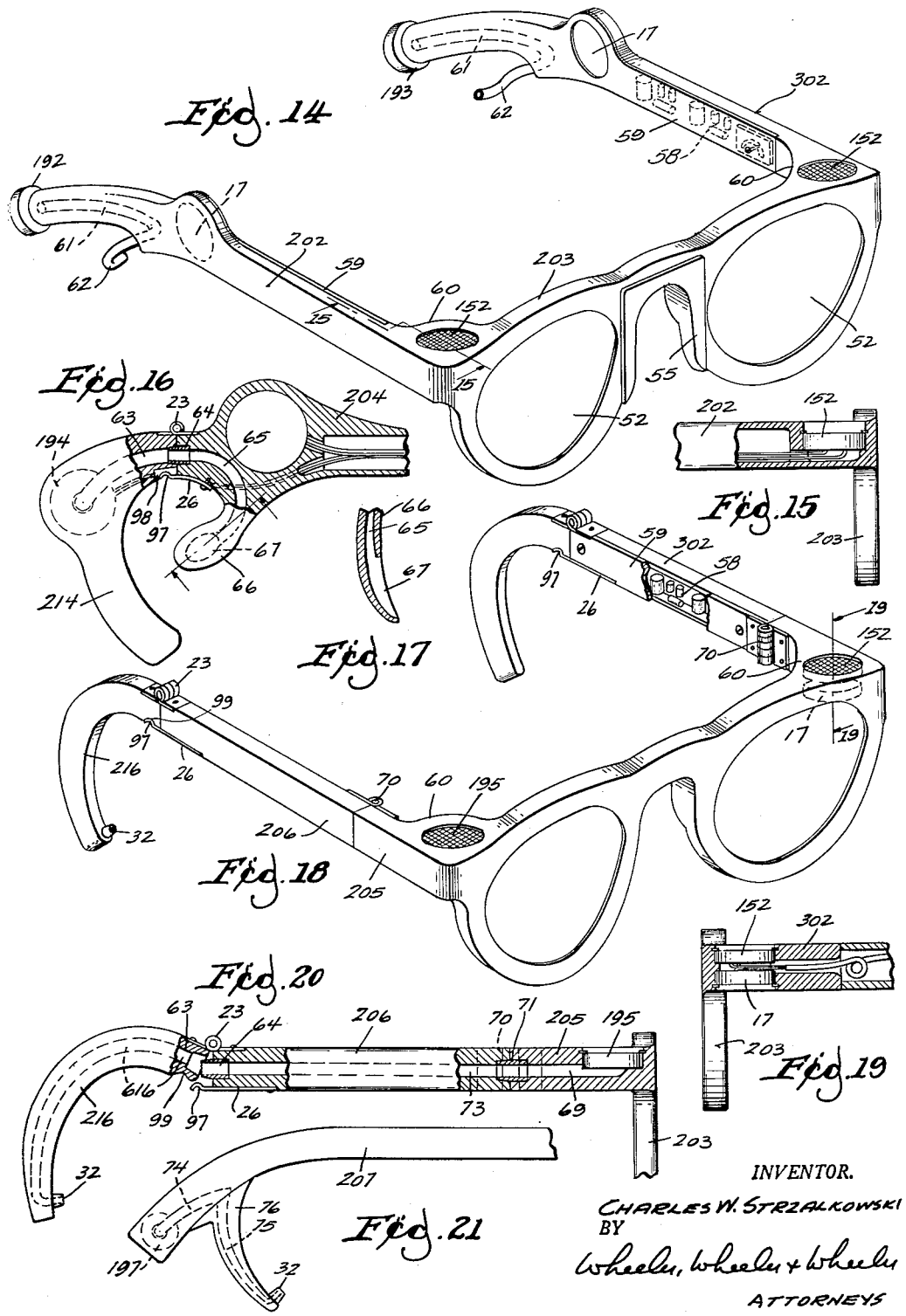

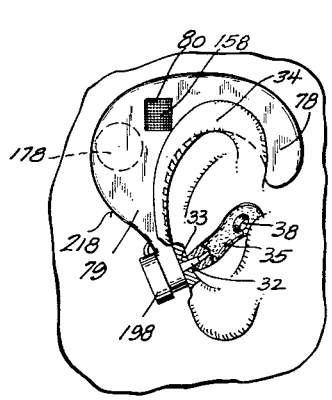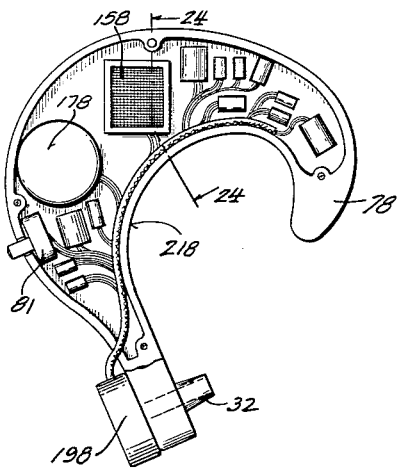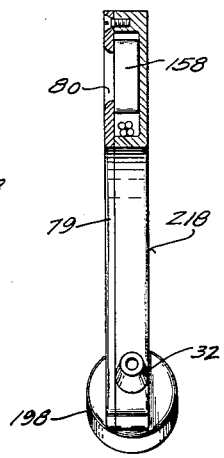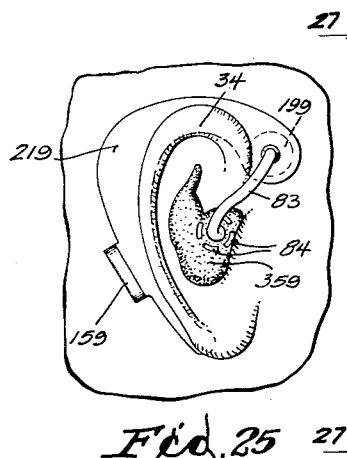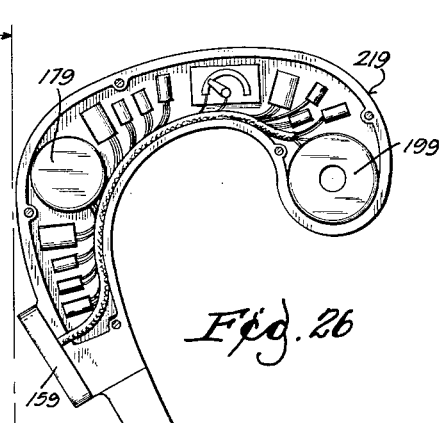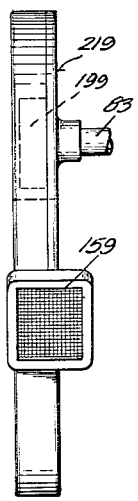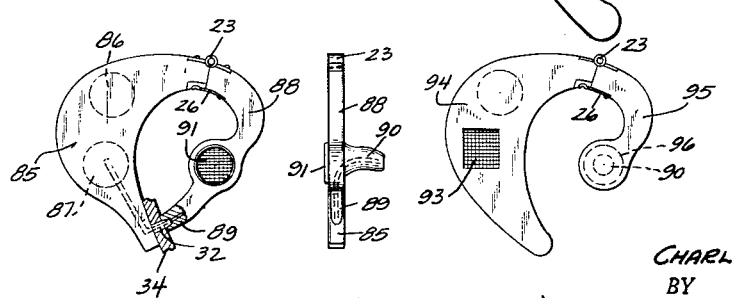

United States Patent Office 3,035,127
Patented May 15, 1962

3,035,127
HEARING AIDS
Charles W. Strzalkowski, 824 N. 27th St.,
Milwaukee, Wis.
Filed Apr. 15, 1955, Ser. No. 501,473
26 Claims. (Cl. 179—107)

This invention relates to hearing aids of the type incorporated in spectacles, or otherwise engaged about the wearer's ear like the temple or bow of a pair of spectacles.

The invention is particularly concerned with the manner in which electrical and sound canal portions of the apparatus are mounted on the member which engages the outer ear and the manner in which the sound is communicated to the inner ear without feed back and, desirably, with directional response. The disclosure includes details of means for the pivotal movement of the ear engaging part and it includes special hinges and other forms of contacts for accommodating electrical connections in the course of such movement. Several of the embodiments disclosed are incapable of application to the wearer's ear, except through the provision of relative hinged movement immediately adjacent the outer ear. In some instances, the sound is carried through an opening made by auricolostomy in the outer ear, in accordance with my co-pending application Serial Number 308,444, filed September 8, 1952, of which this application is a continuation-in-part. In other instances, sound is communicated to the plug or insert in the inner ear without passing through the outer ear. Provision is made in some embodiments for binaural hearing.

The invention also contemplates imbedding the amplifier or battery or other hearing aid elements in plastic used to constitute portions of the spectacle frame or temple, and I have found a plastic peculiarly suited to this purpose. Its chemical composition is as yet unknown, but its manufacture is extremely simple. The product is a partial combustion product of styrene resin (the term "styrene" is used to include polystyrene). In practice styrene foam is ignited and as soon as it develops sufficient heat to melt itself, the flame is extinguished. The resulting product has characteristics very different from that of the original styrene in that it is readily soluble, melts at a low melting point, does not adhere strongly to metal and hence may be softened locally with a soldering iron or the like for the insertion or removal of the hearing aid components.

In the drawings:

FIG. 1 is a view in perspective of a pair of spectacles incorporating hearing aid apparatus in accordance with the present invention.

FIG. 2 is a view taken in section on the line 2—2 of FIG. 3.

FIG. 2A is a fragmentary detailed view similar to FIG. 2, showing an embodiment in which the components are imbedded in a plastic resin.

FIG. 3 is an enlarged detailed view showing in side elevation the inside of the right hand temple from the point of view of line 3—3 in FIG. 1, the cover plate for an internal cavity in the temple being removed to expose the electrical apparatus housed therein.

FIG. 4 is a fragmentary detailed view partially in side elevation and partially in section showing the device of FIGS. 1 to 3 as it appears in use, a portion of the wearer's outer ear being broken away to expose the connection made therethrough by the auricolostomy therein.

FIG. 5 is a detailed view taken in section on the line 5—5 of FIG. 3.

FIG. 6 is a bottom plan view taken from the viewpoint of the line 6—6 of FIG. 3.

FIG. 7 is a view similar to FIG. 1 showing a modified embodiment of the invention using a hearing aid assembly which is conventional except for the receiver, the latter being mounted in a hinged portion of the spectacle temple.

FIG. 8 is a fragmentary plan view of the hinged connection of the temple with the spectacle frame, portions being broken away to expose an electrical contact therein.

FIG. 9 is a view taken in section on the line 9—9 of FIG. 8.

FIG. 10 is an inner side elevation of portions of the temple from the viewpoint indicated by line 10—10 in FIG. 7, portions of the temple being omitted to expose the interior construction.

FIG. 11 is a view showing an interchangeable saddle for the bridge of the wearer's nose, whereby the spectacle frame may be standardized, requiring only an interchangeable saddle insert to adapt it for use by different wearers.

FIG. 12 is a view taken in section on the line 12—12 of FIG. 11.

FIG. 13 is a view in perspective of the saddle insert.

FIG. 14 is a further view similar to FIG. 1 showing a further modified embodiment of the invention.

FIG. 15 is a detailed view taken in section on the line 15—15 of FIG. 14.

FIG. 16 is a fragmentary detail view showing a further modification of the portion of the temple which engages the wearer's outer ear.

FIG. 17 is a view taken in section on line 17—17 of FIG. 16.

FIG. 18 is a perspective view similar to FIG. 14 showing a further modified embodiment of the invention.

FIG. 19 is a detail view taken in section on the line 19—19 of FIG. 18.

FIG. 20 is a side elevational view of the temple portion of the spectacle of FIG. 18, portions being broken away to expose the sound canal formed therein.

FIG. 21 is a view in side elevation fragmentarily illustrating a different embodiment of temple.

FIG. 22 is a view in side elevation of a hearing aid which rides upon the wearer's outer ear in something the same manner in which a spectacle temple is engaged therewith, portions being broken away.

FIG. 23 is an enlarged detail view of the device of FIG. 22 in side elevation with its cover removed.

FIG. 24 is a view taken in section on the line 24—24 of FIG. 23.

FIG. 25 is a view similar to FIG. 22 showing a further modified embodiment.

FIG. 26 is a view on an enlarged scale showing the device of FIG. 25 in side elevation with portions of its front wall removed.

FIG. 27 is a view of the device of FIG. 26 in rear elevation.

FIG. 28 is a view similar to FIG. 22, showing a further modified embodiment.

FIG. 29 is a view of the device of FIG. 28 as it appears in rear elevation.

FIG. 30 is a view similar to FIG. 28 showing a still further modified embodiment.

In the embodiment shown in FIGS. 1 to 6, the spectacle frame 1 has temples or bows 2 and 3 connected thereto by hinges which are desirably in multiple, as shown at 4, 5, 6 and 7 in FIG. 3. Each hinge provides a current carrying connection for leads from the cable 8 which supplies amplifier parts housed within the cavity 9 of temple 2 in the manner best illustrated in FIG. 3. These parts may include such elements as a variable resistor 10, transistors 11, fixed resistants 12, and capacitors 13. An enlargement molded into the temple 2 at 14 receives a microphone 15 to receive the sound for amplification by the amplifier. The temple 3 has a similar enlargement at 16 for a battery 17. The amplifier sound is delivered to speakers or receivers 19, 20, mounted in the hinged extension 21, 22 of the respective temples and communicating with the user's inner ear in any one of a number of ways hereinafter to be described.

Electrical connections to the reproducers 19 and 20 is made across the hinges 23, 24 by pairs of spring contacts 25, 26, shown in FIGS. 1, 3, and 6. Connection of the battery 17 to the amplifier and connection of the amplifier to the receiver or reproducer 20 are made by means of the four wires shown at 28 in FIGS. 1, 2, and 3, these being disposed in a channel 29 in the top of the spectacle frame 1 which is desirably closed by a plastic seal at 30.

The resulting product is symmetrical in appearance, corresponding enlargements in the two temples respectively housing the microphone and the battery, and corresponding enlargements in the temple extensions 21, 22 housing the respective receivers.

Because it is desired that the extensions 21, 22 curve completely around the outer ear, it would be difficult or impossible to manipulate them into position but for the hinges 23, 24. The extent to which parts 21 and 22 project is determined by the necessity of providing connections at 32 which must be manipulated through the opening 33 in the wearer's outer ear 34 (FIG. 4) to engage in the molded insert 35 which is received into the patient's ear canal. The opening 33 is formed in the outer ear by the operation known as auricolostomy, and described in the co-pending application above identified. A passage shown at 36 in dotted lines in FIGS. 1 and 3 and in full lines in FIG. 5 leads from the receiver 19 to the tubular plug 32. As also disclosed in my co-pending application, the plug fitting 35 which fits the patient's ear canal may have a central opening at 38 through which sound may directly enter the ear canal, to be augmented by sound derived through the plug 32 and the duct 39 which leads to the inner ear beside passage 38.

In using the device shown in FIGS. 1 to 6 inclusive, the operator will first place in his ear canal the plugs 35 with their socketed ends in registry with the openings 33 in the outer ears. He will then mount the spectacle frame across the bridge of his nose in the usual way and lower the temples into place across the tops of the outer ears, maintaining the extensions 21 and 22 hinged upwardly until the temples proper are in position. Thereupon, the extensions 21 and 22 will be pivoted downwardly until the respective plug portions 32 penetrate the openings 33 of the respective outer ears and enter the socketed portion of the ear canal plugs 35. The device is then in operation, since the opening of the temples upon hinges 4, 5, 6, and 7 completes the necessary electrical circuits between the temples and the lowering of the extensions 21, 22 completes the electrical circuits to receivers 19 and 20. Although both ears receive sound in the instant device, it will be understood that only one microphone is used and one of the receivers may be omitted if unnecessary.

The device shown in FIGS. 7 to 10 is quite similar in many respects to the device shown in FIGS. 1 to 6. However, the temples 200 and 300 do not house the amplifier or the battery or the microphone, all of these conventional parts being housed in a conventional case 40 which has the microphone 150 exposed in the usual way. The voice current output from the amplifier passes through cable 42 to a plug 43 for which the free end of temple extension 210 is provided with prongs at 44 (FIG. 10). The voice currents are carried thence through wires 45 to terminals 46 engaged by the spring prongs 25, 26 disclosed in the previous embodiment. Thence the wires 47 lead back to the receiver 19 while wires 48 lead through the temple 200 and across the frame 100 and through the temple 300 to receiver 201, which serves the wearer's left ear. Aside from the fact that the conventional hearing aid case 40 is carried in the wearer's pocket or elsewhere on his person, the functioning of this device is essentially similar to that above described.

However, since there are only two wires to be accommodated, I may, as an alternative arrangement, use spring contacts at 49 to which the wires 48 are connected. The temples 200 and 300 move on a conventional hinge at 400 and when the temples are opened the engagement of spring contacts 49 with fixed contacts 50, as shown in FIGS. 8 and 9, completes the circuits across the hinged connection between the parts.

In view of the relative complexity of devices of this character, it becomes undesirable that the spectacle frame be made specially to fit the requirements of a particular user. Accordingly, with any of the spectacle embodiments herein disclosed, it is proposed that the frame be standardized, perhaps in two or three different sizes, so that any user of a frame of given size can be fitted by simply equipping the frame with appropriate lenses 52 and with a special interchangeable nose piece 55 having an external channeled contour at 56 to embrace the frame, and having a downwardly opening notch at 57 which may be custom made either by molding, grinding, or cutting to fit the contours of the bridge of the nose of the particular user. The provision of interchangeable nose pieces is a feature usable to advantage in the fitting of any type of spectacles whether or not these incorporate hearing aid mechanisms.

In the device of FIGS. 14 and 15, two entirely separate hearing aid devices are incorporated in the temples 202 and 302. It will be observed that these are rigidly connected with the spectacle frame 203 instead of being hinged thereto. Each is provided with a battery 17. Each contains its own amplifier generically identified by reference character 58 and covered by the removable closure plate 59. In this instance, the respective microphones 152 are located in webs 60 which bridge the angle between the temples and the spectacle frame, the microphones being exposed upwardly. The respective receivers 192 and 193 are located directly at the ends of temples 202 and 302. They communicate with the ear canal inserts (not shown in this view) by means of internal ducts 61 within the temples and external tubes 62 which are designed to pass in front of the wearer's external ears to the molded ear canal inserts of conventional form. Since the temples are not here required to hook around the external ear, they are relatively straight like those of conventional glasses and no hinged extensions are required. Since each receiver derives its amplified sound from a separate microphone on the corresponding side of the wearer's head, the effect produced in the auditory nerves of the wearer is binaural.

FIG. 16 shows a modification of the device of FIGS. 14 and 15 in which the extension 214 of the temple 204 is hinged at 23 exactly as in FIG. 1, and the receiver 194 is located similarly to receiver 19 in the construction of FIGS. 1 to 6. Here, however, the conduit 63, which conveys the sound from the receiver toward the ear canal, is located within extension 214 and terminates in a socket into which plug 64, at the end of a continuing conduit 65 in the temple member 204, engages when the temple extension 214 is in the operative positions shown in FIG. 16. The socket and plug arrangement permits free hinged movement of the extension but provides a continuous passage for sound when the device is in use.

Obviously the passage 65 might lead to an external tube such as that shown at 62 in FIG. 14. Instead, I have illustrated an alternative embodiment in which the passage 65 extends through a downwardly branching arm 66 which is provided at its lower end with a concave reflecting surface 67 directly opposite the ear canal, this device being designed to be worn without a molded insert in the canal.

The device of FIGS. 18 to 20 show another variation of the construction illustrated in FIG. 14. Here one of the corner webs 60 is used to house the microphone 152, exactly as in FIG. 14, but the right hand corner web 60 houses the receiver 195. As best illustrated in FIG. 19, the battery 17 may be located immediately beneath the microphone.

From the receiver 195, a sound tube or passage 69 leads rearwardly through the short length of temple 205. At the hinge 70, the short forward fixed temple portion 205 is provided with a tubular stud 71 which, in the aligned position of temple portion 206, engages the socketed end of temple portion 206 in registry with the duct 73 therethrough. The arrangement is similar to that disclosed in connection with FIG. 16, and the FIG. 16 arrangement is duplicated at the hinge 23 which unites the temple extension 216 with temple portion 206. However, as a variant, and to show the versatility of the organization, the sound is carried through the duct 616 of extension 216 to a terminal plug 32, used as in the devices of FIGS. 1 to 5 to communicate with an ear canal insert such as that shown at 35 in FIG. 4.

In any temple such as that shown at 207 in FIG. 21, and which may have a receiver 197 at some point behind the wearer's outer ear, the sound passage 74 from the receiver may communicate with a passage 75 in a branching arm 76 terminating in such a plug 32 as that already described. The arms 76 may be used where it is desired to convert any structure of the general type of that shown in FIG. 14 for use with a connection through the outer ear when the patient has an auricolostomy.

The devices of FIGS. 22 to 30 apply some of the foregoing principles to a situation in which the user does not have spectacles in which the hearing aid or parts thereof may be incorporated. Moreover, the devices illustrated in FIGS. 22 to 30 are well adapted for installations where binaural hearing is a factor.

The fitting at 218 has considerable resemblance in its general form to the temple extension 21 of FIG. 1 or 216 of FIG. 18. Because it lies against the wearer's skull, the fitting 218 can be characterized as a skull temple fitting. It is made to curve around the wearer's outer ear 34. However, no spectacles being involved, the fitting has a downward curve at 78 which hooks it about the front portion of the outer ear. Because this particular device requires that the fitting 218 house the entire hearing aid apparatus, the fitting has increased depth as compared with the temple extensions 21 or 216. It is also made hollow and provided with a removable closure plate 79 having an aperture at 80 registering with the microphone 158. The various components of the amplifier are fitted into the cavity, as shown in FIG. 23, as is the battery 178. The volume control 81 has a knob projecting for convenience of manipulation, and the receiver 198 is, in this instance, located outside of the fitting 218 in rectilinear communication with the plug 32 which projects through the aperture 33 in the outer ear to engage the plug fitting 35 which is molded to fit the patient's ear canal. As will be observed, the device is not only compact, but is adapted, if made in right and left hand forms, to provide binaural hearing, each such device serving the ear upon which it is mounted.

It is a desirable feature of so compact a device that the receiver and the microphone be in planes at right angles to each other to minimize the possibility of feed back.

The device shown in FIGS. 25 to 27 is in many respects a reversal of that illustrated in FIGS. 22 to 24. The skull temple fitting 219 carries the microphone 159 at its rear and the receiver 199 at its forward portion. Like the previous device, it is made hollow to receive the battery 179 and the various amplifier components. This organization is a preferred arrangement for use when the patient has no auricolostomy, the sound conduit from the receiver 199 communicating through the tube 83 with the ear canal insert 359. This latter happens to have its pressure relief and direct sound admission ports 84 disposed in annular series around the tube 83 instead of being at the center as was the opening 38 in FIGS. 4 and 22.

The device of FIGS. 28 and 29 has an exceptionally secure mounting upon the wearer's outer ear because the skull temple fitting 85 which houses the battery 86 and receiver 87 has a hinged extension 88 which extends in front of the wearer's outer ear and across the ear canal to provide a socketed portion 89 which engages the plug 32 projecting from the lower end of fitting 85 through the aperture formed in the patient's ear by auricolostomy. In this device, the extension 88 is itself provided integrally with a molded insert at 90 received into the patient's ear canal and directly over which extension 88 carries the microphone 91 so that sound reception is highly directional, the microphone being directly in line with the ear canal. The wiring from the microphone to the amplifier housed within fitting 85 is completed across the joint at hinge 23 by means of spring contacts 26 identical to those used in the constructions previously described.

The device of FIG. 30 is closely converse to that of FIGS. 28 and 29, but in this instance the microphone 93 is mounted in the skull temple fitting 94 which houses the amplifier behind the patient's outer ear. The hinged extension arm 95 terminates opposite the ear canal and carries the receiver 96 in direct alignment with and communication with the insert 90 which enters the patient's inner ear. In the devices of FIGS. 28 to 30, there is sufficient encirclement of the patient's outer ear so that, in each case, the hinged connection provided at 23 is desirable as a means of applying and removing the hearing aid. It should be noted that the contact springs 26 not only provide electrical connection across the hinged joint but also provide a mechanical detent which holds the parts against relative hinged movement, the spring contacts being provided with transversely ribbed ends shown on the largest scale at 97 in FIGS. 18 and 20 and cooperating with transversely channeled portions which may be formed in the complementary contacts, as at 98° in FIG. 16 or in the plastic or other material as shown at 99 in FIGS. 18 and 20. In FIGS. 18 and 20, these springs are detents only, having no electrical functions. If desired, the hearing aid components may be imbedded in whole or in part in plastic, as is shown fragmentarily at 209 in FIG. 2A.

A plastic peculiarly suited for the purpose is a partial combustion product of styrene. If unburned styrene is melted, it tends to adhere strongly to the mold and to the items imbedded in it. If the styrene, particularly in the form of foam, is ignited, partially burned, and then extinguished, it acquires definitely different properties from those of the styrene resin. It is dark, practically black in color, presumably from the carbon. It is extraordinarily light in weight, despite the fact that it no longer has the form of foam. Its compressive strength is high and it is tough and hard, but softens at very low temperatures. Moreover, it can be softened locally for the insertion or removal of an electric component and it releases the metal readily and completely so that the electric component is neither damaged by heat nor disfigured by adhesion of plastic. However, it adheres strongly to wood and to other resins such as methacrylate.

It has very high dielectric strength so that the wires connecting the hearing aid components can be laid into the resin without other insulation.

Moreover, this plastic is capable of very high luster when polished or when molded against metal or some other smooth surface to which it does not adhere.

Not only can it readily be softened by relatively low temperatures, but it is readily soluble in ether or acetone and retains its solubility. It is also readily drilled, filed and otherwise worked or polished. Paint and lacquer clings well to it.

In all of the embodiments shown, advantage is taken of the reduced physical dimensions of hearing aid components to mount these in unusually compact organizations which, in most instances, are entirely worn upon the user's head. The construction of FIG. 7 is the only one which contemplates any connection to a set carried elsewhere on the body. In most of the embodiments shown, at least a part of the positioning of the apparatus is dependent upon complete or partial encirclement of the external ear, and in many instances all visible portions of the apparatus are eliminated from the forward part of the external ear so that there is little or nothing apparent in the use of the apparatus to indicate that the user is deficient in hearing. Superior sense of direction and reception of sound are among the additional advantages, even without the binaural arrangements disclosed in some of the drawings.

I claim:

1. In a hearing aid appliance adapted to be worn by the user to receive support from his outer ear and to deliver sound to his ear canal, the combination with arcuate supporting means for partially encircling the outer ear, of a hearing aid comprising a microphone, an amplifier, a receiver and electrical connecting means, said receiver being mounted on said arcuate supporting means and said latter means having a sound communicating duct leading from said receiver toward the ear canal of a person wearing said supporting means about his outer ear.

2. The device of claim 1 in which said appliance comprises a spectacle frame temple provided with said arcuate supporting means.

3. The device of claim 1 in which said appliance comprises a spectacle frame temple provided with said arcuate supporting means and constituting means for housing the other said elements of said reproducer.

4. The device of claim 1 in further combination with an ear canal insert having an opening into the ear canal in which it is worn, and means providing communication between the sound communicating duct of said arcuate supporting means and the said opening in the ear canal insert.

5. The device of claim 4 in which the said means providing communication includes detachable plug and socket members respectively connected with the arcuate supporting means and with the ear canal insert.

6. The device of claim 5 in which the duct lies behind the outer ear of its wearer and the plug member extends through the outer ear, the socket member being in telescopic engagement with the plug member and in substantial engagement with the outer ear.

7. In a hearing aid appliance adapted to be worn by the user to receive support from his outer ear and to deliver sound to his ear canal, the combination with arcuate supporting means for partially encircling the outer ear, of a hearing aid comprising a microphone, an amplifier, a receiver, and electrical connecting means, the receiver being mounted on said arcuate supporting means and said latter means having a duct leading therefrom toward the ear canal of a person wearing said appliance, an ear canal insert having a passage with which the duct aforesaid communicates, plug and socket members in telescopic engagement and respectively communicating with said arcuate supporting means and with said insert, an eyeglass temple, and a hinge connecting said temple with said arcuate supporting means for accommodating relative hinged movement of the supporting means to facilitate application to and removal from the outer ear.

8. The device of claim 7 in which other elements of the hearing aid are housed within said temple and the temple and supporting means are provided with resiliently yieldable means connected therebetween for holding said supporting means in ear encircling position.

9. The device of claim 8 in which the said temple contains elements of said hearing aid, said resiliently yieldable means providing an electrical connection across the hinge between said last mentioned elements and said receiver, and means for opening said electrical connection in one hinged position of said supporting means.

10. The device of claim 7 in combination with an eyeglass frame with which the temple is in rigid connection and disposed substantially at right angles thereto, a web spanning the angle between the temple and the eyeglass frame, one component element of said hearing aid being mounted in said web.

11. The device of claim 7 in which said temple has a cavity in which an element of the hearing aid is disposed, and a removable closure plate covering said cavity.

12. The device of claim 7 in which said temple is provided with an enlarged mounting for the microphone element of said hearing aid.

13. In a hearing aid appliance adapted to be worn by the user to receive support from his outer ear and to deliver sound to his ear canal, the combination with arcuate supporting means for partially encircling the outer ear, of a hearing aid sound reproducer including a microphone, an amplifier, a receiver, and electrical connecting means, and having its receiver mounted on said supporting means, said supporting means having a sound communicating duct so positioned as to lead toward the auditory canal of a person wearing said supporting means upon his outer ear, said duct leading forwardly above the level of the lower end of the outer ear, and an ear canal insert having a flexible sound tube and having an opening extending through the insert, said tube and said supporting means having sound conduit coupling means for detachably connecting said flexible tube in sound-receiving engagement with said duct.

14. The combination set forth in claim 13 in which said coupling means comprises plug and socket members respectively connected with the supporting means and with the tube and in telescopic engagement with each other, the member connected with said tube being disposed directly forwardly of the wearer's outer ear and the member connected with the supporting means extending thereto through the wearer's outer ear.

15. The device of claim 13 in further combination with a spectacle frame having a temple of which said supporting means constitutes a rearward extension, the receiver being mounted on the supporting means at the rear of the wearer's outer ear and the microphone being mounted on said temple forwardly of the wearer's outer ear.

16. The combination set forth in claim 15 in which the microphone and receiver are disposed substantially at right angles to each other.

17. In a hearing aid appliance adapted to be worn by the user to receive support from his outer ear and to deliver sound to his ear canal, the combination with arcuate supporting means for partially encircling the outer ear, an electrical sound reproducer including as elements a microphone, an amplifier, and a receiver and having one of its component elements disposed in part within said supporting means, said supporting means including a sound communicating duct so positioned as to lead toward the auditory canal of a person wearing said supporting means about his outer ear, in further combination with a spectacle frame having a temple with one of which said supporting means is connected, said spectacle frame having hollow portions housing component elements of said reproducer, and a nose bridge piece detachably connected with said spectacle frame.

18. The device of claim 17 in which said spectacle frame has widely spaced lens sockets, said nose bridge piece being externally channeled complementarily to the frame at the lens sockets and having a downwardly opening notch to fit the nose bridge of the wearer.

19. The device of claim 17 in which the nose bridge piece comprises a pre-fabricated insert having a downwardly opening notch and channeled side and ends, said spectacle frame having portions complementary to and receivable in said channels.

20. In a hearing aid appliance adapted to be worn by the user to receive support from his outer ear and to deliver sound to his ear canal, the combination with arcuate supporting means for partially encircling the outer ear, of a hearing aid comprising a sound reproducer including as elements a microphone, an amplifier, and a receiver and having at least one of its component elements disposed at least in part within said appliance, said supporting means including a sound communicating duct so positioned as to lead toward the auditory canal of a person wearing said supporting means about his outer ear, in further combination with a spectacle frame provided with temples, said supporting means constituting a part of one of said temples, said last mentioned temple having a plurality of hinges provided with axially aligned pintles, the several hinges being spaced axially of their aligned pintles and comprising electrical connections in the circuit of said reproducer.

21. In a hearing aid appliance adapted to be worn by the user to receive support from his outer ear and to deliver sound to his ear canal, the combination with arcuate supporting means for partially encircling the outer ear, of a hearing aid comprising a sound reproducer including as elements a microphone, an amplifier, and a receiver and having one of its component elements disposed within said supporting means, said supporting means including a sound communicating duct so positioned as to lead toward the auditory canal of a person wearing said supporting means about his outer ear, in further combination with a part in hinged connection with said supporting means and having a duct communicating across the hinge with the duct of said supporting means, said supporting means and part being provided with complementary tubular plug and socket portions engaged in one position of hinged adjustment of said part respecting said supporting means.

22. The device of claim 21 in further combination with a spectacle having a temple which includes said supporting means.

23. The device of claim 22 in which the spectacle comprises an eye glass frame with which the temple aforesaid is in rigid connection, said frame having a web spanning the angle between the frame and said temple, and a receiver mounted in said web and from which said duct leads through said temple to said supporting means.

24. In a hearing aid appliance adapted to be worn by the user to receive support from his outer ear and to deliver sound to his ear canal, the combination with supporting means adapted to rest on the outer ear and having a cavity therein, an electrical sound reproducer in the cavity and including as elements, a microphone, an amplifier and a receiver, a sound communicating duct connected with the receiver and disposed in a position to lie behind the outer ear upon which said supporting means rests, another duct so positioned as to lead from said first duct directly forwardly in a substantially horizontal direction toward the auditory canal of a person wearing said appliance, and means for connecting said ducts and including detachably connected parts substantially at the level of such an auditory canal.

25. The device of claim 24 in which the detachably connected parts comprise plug and socket elements in telescopic connection, the said elements communicating with respective duct parts substantially at the same level as the canal and at opposite sides of the wearer's outer ear.

26. A hearing aid device comprising an appliance having a portion of arcuate form adapted for at least partial encirclement of the outer ear, an electrical sound reproducer including as elements a microphone, an amplifier, and a receiver and having at least one of its component elements disposed at least in part within said appliance portion, the said appliance portion having a rear tip adapted to lie behind the outer ear and having a forwardly directed sound tube connection communicating with said receiver for the delivery of sound waves developed therein.

References Cited in the file of this patent

UNITED STATES PATENTS

| | | |
|---|---|---|
| 574,124 | Wainwright | Dec. 29, 1896 |
| 1,154,069 | Soret | Sept. 21, 1915 |
| 1,559,550 | Carroll | Nov. 3, 1925 |
| 2,207,705 | Cox | July 16, 1940 |
| 2,430,229 | Kelsey | Nov. 4, 1947 |
| 2,582,345 | Moeller | Jan. 15, 1952 |
| 2,590,821 | Kiser | Mar. 25, 1952 |
| 2,612,076 | Dietz | Sept. 30, 1952 |
| 2,613,282 | Scaife | Oct. 7, 1952 |
| 2,701,392 | Eich | Feb. 8, 1955 |
| 2,765,373 | Smith | Oct. 2, 1956 |
| 2,792,457 | Zapelloni | May 14, 1957 |
| 2,830,132 | Borg | Apr. 8, 1958 |
| 2,930,857 | Hollingsworth | Mar. 29, 1960 |
| 2,930,858 | Hollingsworth | Mar. 29, 1960 |

FOREIGN PATENTS

| | | |
|---|---|---|
| 723,981 | Great Britain | Feb. 16, 1955 |